(12) United States Patent
Martirosyan et al.

(10) Patent No.: US 9,812,747 B2
(45) Date of Patent: Nov. 7, 2017

(54) GAS-SHIELD-ELECTRODE AND COMPOSITE BIFUNCTIONAL AIR-ELECTRODE USING THE SAME FOR USE IN METAL-AIR BATTERIES

(71) Applicant: AZA Holding Pte. Ltd., Singapore (SG)

(72) Inventors: Suren Martirosyan, Yerevan (AM); Didier Guillonnet, Paris (FR)

(73) Assignee: AZA HOLDING PTE. LTD., Singapore (SG)

( * ) Notice: Subject to any disclaimer, the term of this patent is extended or adjusted under 35 U.S.C. 154(b) by 127 days.

(21) Appl. No.: 14/415,802

(22) PCT Filed: Jul. 16, 2013

(86) PCT No.: PCT/IB2013/055844
§ 371 (c)(1),
(2) Date: Jan. 20, 2015

(87) PCT Pub. No.: WO2014/013433
PCT Pub. Date: Jan. 23, 2014

(65) Prior Publication Data
US 2015/0200431 A1 Jul. 16, 2015

Related U.S. Application Data

(60) Provisional application No. 61/672,935, filed on Jul. 18, 2012, provisional application No. 61/763,737, filed on Feb. 12, 2013.

(51) Int. Cl.
*H01M 10/052* (2010.01)
*H01M 12/08* (2006.01)
(Continued)

(52) U.S. Cl.
CPC ......... *H01M 12/08* (2013.01); *H01M 4/8615* (2013.01); *H01M 4/8657* (2013.01); *H01M 4/8875* (2013.01); *H01M 2004/8689* (2013.01)

(58) Field of Classification Search
CPC . H01M 10/052; H01M 12/08; H01M 2220/20
See application file for complete search history.

(56) References Cited

U.S. PATENT DOCUMENTS 4,341,848 A 7/1982 Liu et al.
4,524,114 A 6/1985 Samuels et al.
(Continued)

FOREIGN PATENT DOCUMENTS

FR 2102480 A5 4/1972

OTHER PUBLICATIONS

International Search Report, dated Dec. 6, 2013, from corresponding PCT application.

*Primary Examiner* — Olatunji Godo
(74) *Attorney, Agent, or Firm* — Young & Thompson

(57) ABSTRACT

Method of operating a secondary Metal-Air electrochemical cell with a metal anode and an air cathode including the steps of (a) at start of a charging session, creating in less than 2 seconds an oxygen gas-shield on the electrolyte side of the air-electrode obstructing ion passage between the bulk of the electrolyte and the air-electrode; (b) charging the cell without anodic polarization of the air-electrode with the help of (i) electric conductive material placed between the electrolyte side of air-electrode and the bulk of electrolyte, and, (ii) the oxygen gas-shield obstructing passage of ions of the electrolyte between the electrolyte side of air-electrode and the bulk of electrolyte; (c) removing the oxygen gas-shield at start of a discharging session.

14 Claims, 9 Drawing Sheets

(51) Int. Cl.
*H01M 4/86* (2006.01)
*H01M 4/88* (2006.01)

(56) References Cited

U.S. PATENT DOCUMENTS

| | | |
|---|---|---|
| 5,306,579 A | 4/1994 | Shepard, Jr. et al. |
| 5,445,901 A * | 8/1995 | Korall ................. H01M 12/065 |
| | | 429/118 |
| 6,127,060 A | 10/2000 | Read |
| 6,127,061 A | 10/2000 | Shun et al. |
| 2005/0118493 A1 | 6/2005 | Datz et al. |
| 2006/0210706 A1 | 9/2006 | Chen et al. |
| 2007/0166602 A1 | 7/2007 | Burchardt |
| 2010/0323249 A1 * | 12/2010 | Fujiwara ................... C25B 9/10 |
| | | 429/403 |
| 2011/0236772 A1 | 9/2011 | Burchardt et al. |

* cited by examiner

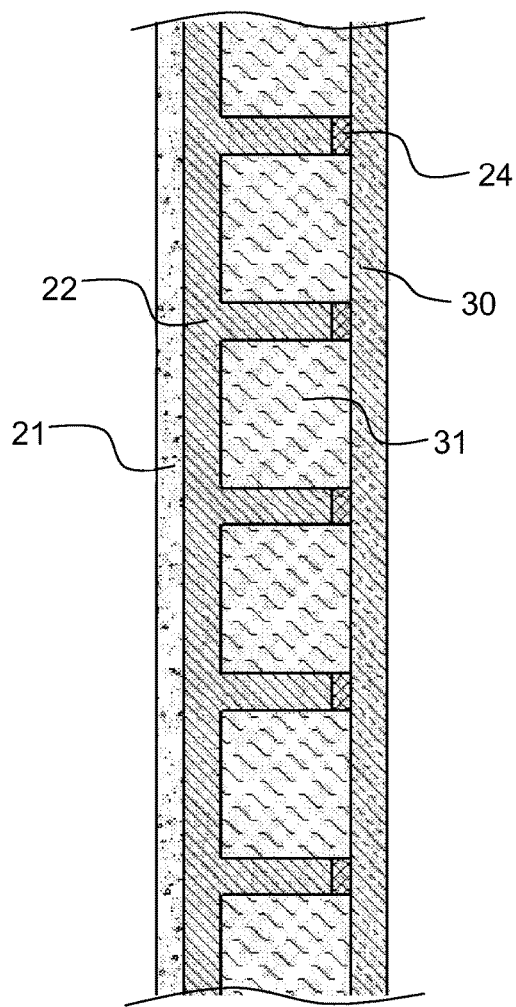 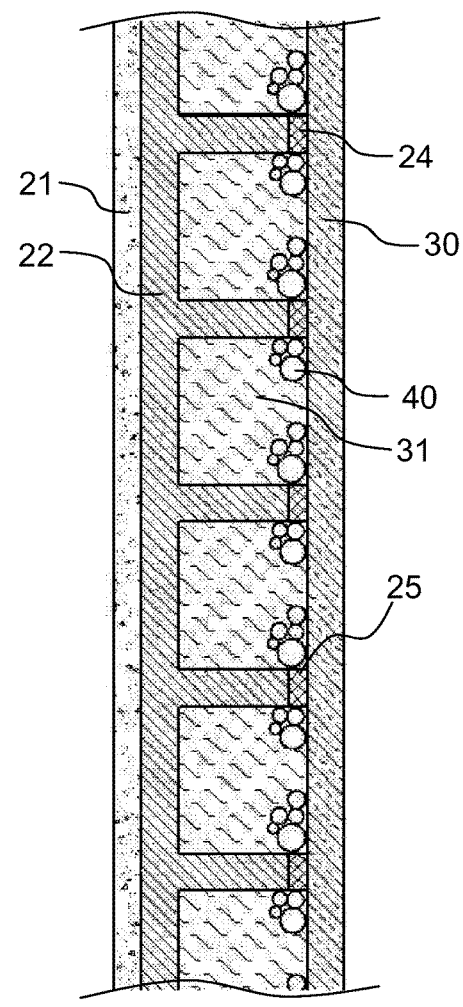
*FIG. 3*  *FIG. 4*

GAS-SHIELD-ELECTRODE AND COMPOSITE BIFUNCTIONAL AIR-ELECTRODE USING THE SAME FOR USE IN METAL-AIR BATTERIES

FIELD OF THE INVENTION

The present patent application relates generally to the field of electrically rechargeable batteries and their components. More specifically it relates to a bifunctional air-electrode for use in secondary metal-air electrochemical cells.

BACKGROUND OF THE INVENTION

1. Existing Need

Electrically rechargeable batteries are strategic components of electric vehicles. The goal is to have high energy density, high power density, be environmentally friendly, cheap and safe batteries. At the moment Lead-acid, NiMH and different types of Li-ion batteries are favorite for EV usage but they all suffer at least one drawback, mainly cost or safety in case of high energy density battery.

Metal-air cells are well-known to be relatively lightweight power sources. They utilize oxygen from ambient air or dissolved into water as a reactant in an electrochemical reaction.

Metal-air batteries comprise a negative metal electrode (e.g., zinc, aluminum, magnesium, iron, lithium, etc.) and a positive electrode having a porous structure with catalytic properties for an oxygen reduction reaction (typically referred to as the air-electrode of the battery). An electrolyte is used to maintain high ionic conductivity between the two electrodes. For alkaline metal-air batteries (i.e., having an alkaline electrolyte), the air electrode is usually made from thin, porous polymeric material (e.g., polytetrafluoroethylene) bonded carbon layers. To prevent a short circuit of the battery, a separator is provided between the negative electrode (anode) and the positive electrode (cathode).

In the present description what is called "air-electrode" includes both cases: (i) gas-diffusion electrode consuming oxygen from a gas containing oxygen (typically air) or (ii) gas-diffusion electrode consuming oxygen from a liquid containing dissolved oxygen gas (typically seawater); and what we call "electrolyte side" of the air-electrode is the side to be bathed by the electrolyte.

Also the electrolyte is most often alkaline but it could also be acidic, neutral (salt electrolyte) or aprotonic (non-aqueous).

During discharging of metal-air batteries, in alkaline media, oxygen is converted to hydroxide ions in the air-electrode. The reaction in the air-electrode involves the reduction of oxygen, the consumption of electrons, and the production of hydroxide ions. The hydroxide ions migrate and diffuse through the electrolyte toward the metal negative electrode, where oxidation of the metal of the negative electrode occurs, forming oxides or hydroxides or ions and liberating electrons. In a secondary (i.e. rechargeable) metal-air battery, charging is induced by applying external voltage between the metal-electrode and the air-electrode or an auxiliary-electrode to reverse the electrochemical reactions. Charging converts hydroxide ions to oxygen on the air-electrode or the auxiliary-electrode, releasing electrons, while, at the metal-electrode, the metal oxides or ions are reduced back to form the metal while electrons are consumed.

Metal-air batteries could offer electrically rechargeable batteries with excellent characteristics, but so far no bifunctional air-electrode was available that would allow a metal-air battery to be recharged at acceptable rates.

2. Description of the Prior Art

Some tried to counter the problem in recharging with the help of an auxiliary electrode, for example Ni-metal or Ni-oxide electrode, placed between the metal and the air electrode or placed at the other side of the metal electrode. But this solution is leading to lower characteristics of the battery cell, typically the auxiliary electrode is adding some weight and volume and increasing internal resistance in case it is on the side of the air-electrode, thus the global specific energy density in Wh/kg or Wh/l is lower than cells not employing auxiliary electrode. Also, charging and discharging schemes for a cell with auxiliary electrode is somehow complicated vs. conventional two-lead bifunctional cells as batteries with auxiliary electrode have three leads. Especially if bifunctional air-electrodes are available then a metal electrode can be placed between 2 bifunctional air-electrodes. This cell setup, which is conventional, leads to increased specific power and energy density, plus ease of operation vs. the three-lead auxiliary-electrode cell setup.

A major problem of classical bifunctional air-electrodes is that:

material with catalytic activity, such has carbon black or some specific catalyst, is present in the active layer of the air-electrode in order to reduce oxygen during discharge and to provide means for the air-electrode to consume electrons;

but unfortunately, during recharging, when the air-electrode is under anodic polarization, the said material with catalytic activity along with the active layer material itself are degenerated, the air-electrode losing most of its efficiency and becoming not usable any longer. Indeed a classical issue is the oxidation of carbon black with coloration of electrolyte, which is mainly due to carbon black releasing hydroquinone into the electrolyte when being under the anodic polarization, this leading to loss of its activity.

Therefore there is a need for bifunctional air-electrodes and for secondary metal-air batteries that do not prematurely fail due to deterioration during recharging and that support a large number of discharge/recharge cycles.

Classic Approach

A classic approach to lower air-electrode deterioration is disclosed in U.S. Pat. No. 4,341,848 to Lui et al. incorporated herein by reference. This patent discloses a bifunctional metal-air electrode comprising carbon particles, a bonding/non-wetting agent, and two types of catalyst, one for oxygen reduction during discharge and one for oxygen evolution during recharge. The oxygen reduction catalyst is chosen with a high oxygen evolution potential and oxygen evolution catalyst is chosen with a low oxygen evolution potential. Thus, during recharging, the oxygen evolution catalysts function at the lower voltage to produce oxygen and recharge the cell and exclude the oxygen reduction catalysts from participating in the recharging reaction.

However, even if the recharging is performed at the lower voltage, the air-electrode still deteriorates slowly. Besides, this method of not reaching the other catalyst's decomposition potential does not allow high charging/discharging rates.

Another classic approach to avoid deterioration of the active layer during recharging is disclosed in U.S. Pat. No. 5,306,579 to V. Roger Shepard, Jr. et al., incorporated herein by reference. In this approach the oxygen evolution catalyst is present in a greater concentration proximate the air side than proximate the electrolyte side. However, even when using oxygen reduction catalyst with oxygen evolution potential greater than 2.1 volts and oxygen evolution catalyst with oxygen evolution potential less than 2.0 volts, the service life is improved but the problem is not solved and the air-electrode still deteriorates during recharging. Again here, this method does not allow high charging/discharging rates.

Yet another approach disclosed in U.S. Pat. No. 6,127,060 to Jeffrey A. Read incorporated herein by reference, is to coat the oxygen evolution catalyst with a thin film deposition of a binder such as polytetrafluoroethylene and an electrically conductive particulate material which is not corroded during recharge such as graphite. However this reduces corrosion and increases cycle life but doesn't solve the problem and the air-electrode still deteriorates during recharging.

Yet another approach disclosed in U.S. Pat. No. 4,524,114 to George J. Samuels et al. is to press to the electrolyte-side of the air-electrode a redox matrix containing an insulating and rectifying amount of a dispersed redox conductor.

But in all bifunctional air-electrodes and secondary metal-air batteries proposed so far, the improvement was only partial. Prior art is lacking bifunctional air-electrodes and secondary metal-air batteries that can handle the issues mentioned above.

OBJECT OF THE INVENTION

Accordingly, an object of the present patent application is to disclose a method for operating secondary metal-air electrochemical cells allowing a large number of charge-discharge cycles at high charging/discharging rates.

Another object of the present invention is to provide enhanced bifunctional air-electrodes which function effectively for a large number of charge-discharge cycles in metal-air electrically rechargeable battery cells, and the method of manufacturing them. Yet another object of the present invention is to provide secondary metal-air cells without auxiliary electrode, simpler to operate and presenting enhanced characteristics.

SUMMARY OF THE INVENTION

Surprisingly, the inventor discovered that during recharging, by using the evolved oxygen as a gas-shield insulating the active layer of the air-electrode from the bulk of electrolyte, it is possible to prevent a current flow in the said active layer and thus to block electrochemical activity and prevent degeneration of the said active-layer. It has also been noticed that an alveoli matrix in front of the active-layer can both enhance the insulation effect of the said gas-shield during anodic polarization and create a favorable environment for the active-layer during cathodic polarization.

Nothing in literature could be found approaching the solution described by this patent application.

The first object of the invention is a method of operating a secondary Metal-Air electrochemical cell with a metal anode and an air cathode comprising the steps of:
a) at start of a charging session, creating in less than 2 seconds an oxygen gas-shield on the electrolyte side of the air-electrode obstructing ion passage between the bulk of the electrolyte and the air-electrode
b) charging the cell without anodic polarization of the air-electrode with the help of (i) electric conductive material placed between the electrolyte side of air-electrode and the bulk of electrolyte, and, (ii) the said oxygen gas-shield obstructing passage of ions of the electrolyte between the electrolyte side of air-electrode and the bulk of electrolyte.
c) removing the oxygen gas-shield at start of a discharging session.

The inventor noticed that this method permits to separate more deeply anodic and cathodic processes held on the air-electrode thus protecting from degeneration the air-electrode and the catalysts it can contain during the charging sessions of the cell, even in case the air-electrode is connected to an auxiliary current-collector serving as anode during said charging sessions. This eventually leads to a longer service life of the air-electrode.

With this method, the air-electrode active material can stay permanently connected to a separate current-collector serving as anode during charging, which makes the air-electrode bifunctional thus simplifying metal-air cells (by avoiding the use of auxiliary electrode and corresponding electric circuitry) and simplifying battery management system.

This method is especially applicable when the electrolyte is aqueous (alkaline acidic, neutral, e.g. salt electrolyte) or aprotonic (non-aqueous) organic electrolytes.

It is to be noted that in the present description what we call "air-electrode" includes both cases: (i) gas-diffusion electrode consuming O2 from a gas containing O2 (typically air) or (ii) gas-diffusion electrode consuming O2 from a liquid containing dissolved O2 gas (typically seawater); and what we call "electrolyte side" of the air-electrode is the side to be bathed by the electrolyte.

More preferably, the step (c) of said method is performed by the air-electrode consuming oxygen from its electrolyte-side under cathodic polarization.

Indeed, when the gas-shield develops, the electrolyte side of the air-electrode remains wet, soaked with some electrolyte. And when the polarization of air-electrode becomes cathodic, the inventor noticed that in maximum a few seconds the oxygen-gas-shield is consumed, re-establishing electrolyte communication with the bulk of electrolyte.

Another object of the invention is an electrode, for use in metal-air electrochemical cell with liquid electrolyte, on which under anodic polarization oxygen gas evolves from the electrolyte, wherein the geometry of said electrode is such that:
(i) it permits to perform steps (a) and (b) of claim 1 or 2 by forming a gas-shield under anodic polarization,
(ii) while, without presence of said gas-shield, the electrode offers sufficient passage to allow ions of the electrolyte to flow therethrough.

For the convenience the term "Shield-Electrode" will refer such an electrode thereafter.

Preferably, the shield-electrode's material forms a matrix with hollow spaces retaining the gas-shield, such as porous material, fibers or, even better, alveolar material.

Indeed, in the method object of this patent application, it is preferable that the gas is retained by the hollow spaces and does not escape from one hollow space to fill the other in a movement parallel to the shield-electrode surface; otherwise, in case the shield-electrode is disposed vertically, some electrolyte would flow in hollow spaces to replace the gas escaping and the gas-shield could have difficulty to establish at the bottom of the shield-electrode, i.e where the liquid electrolyte is at higher pressure, because of the difference of density between electrolyte and oxygen gas.

Therefore, in case where the matrix forming hollow spaces comprises fibrous or porous material—for example in order to increase the active surface area under anodic polarization—, the pores in the material separating hollow spaces by forming walls between them should be small enough and the surface tension high enough to prevent the oxygen gas to go through the pores from one hollow space to the other in a movement parallel to the shield-electrode.

Yet preferably, the surface of said hollow spaces is in average between 0.04 mm$^2$ to 50 mm$^2$.

By hollow space's surface is understood the frontal surface area of some hollow space, measured by projection on the shield-electrode's surface.

In preferred embodiments this average surface is rather from 0.25 mm$^2$ till 16 mm$^2$.

Preferably said electrode comprises an alveolar matrix with "walls" separating the alveoli, (such as grid or loose meshwork forming square, triangular or hexagonal (honey comb) alveoli.

It is to be noted that in U.S. Pat. No. 6,127,061 the use of a honeycomb structure is disclosed for use in an air-cathode but for a different goal, not for holding gas bubbles but as current collector inside the air-electrode between an active-layer and a diffusion-layer.

Preferably the thickness of said walls is in average from 0.05 mm till 0.5 mm.

Also some thicker conductive paths can help to reach the center part of the electrode and diminish global resistance.

Preferably the shield-electrode comprises a grid forming channels along which oxygen bubbles and electrolyte can travel easily during anodic polarization, pushed by oxygen evolution. The matrix with hollow spaces is topped by this grid forming channels.

Yet preferably, at least a portion of the sides of said grid forming channels is conductive whereby oxygen evolution mainly takes place on it during anodic polarization, i.e. during charging of the battery. Preferably the thickness of said shield-electrode is from 0.2 mm till 3 mm.

It is to be noticed that for high-load batteries it's better to have lesser thickness and vice-versa, also the minimum height is better for energy density reasons more thickness means lesser discharge voltage because of internal resistance drop in this layer filled with electrolyte. This is a tradeoff between shielding effectiveness and battery efficiency. Yet, simple calculations show that an extra 1 mm electrolyte thickness does not add much to internal resistance of the battery.

Preferably the conductive part of the surface of the shield-electrode consists essentially of any electron-conductive yet indifferent material stable under anodic and cathodic polarization in the electrolyte environment.

The said shield-electrode matrix itself can be conductive (such as electron-conductive yet indifferent material) or non conductive (such as plastic or ceramic) at least partially covered by conductive material. In all cases all the surface area of the shield-electrode that can be in contact with electrolyte should be made out of indifferent material stable under anodic and cathodic polarization in the electrolyte environment.

Preferably said electro-conductive yet indifferent material is selected from the group consisting of: Ni, Co, Au, Pt, Pd, graphite, electroconductive oxides, semiconductors, graphene, electrically conductive diamond-like carbon.

Also other precious or rare metals, the preferred material in case of alkaline electrolyte being Ni and Co.

Another object of the invention is a composite air-electrode for use in electrochemical cell with liquid electrolyte comprising:

an air-electrode comprising an hydrophilic electrolyte side
and a shield-electrode located between the electrolyte side of the air-electrode and the bulk of electrolyte whereby during anodic polarization, an oxygen gas-shield forms and protects the air-electrode from anodic polarization while without presence of the said gas-shield the ions of the electrolyte can pass freely through the shield-electrode between the air-electrode side to the bulk of electrolyte.

Preferably during cathodic polarization the said air-electrode is also able to consume oxygen from its electrolyte side whereby the said gas-shield is consumed and the electrolyte ions communication is re-establish between the air-electrode and the bulk of electrolyte.

In another embodiment, the air-electrode presents cavities on its electrolyte surface serving as hollow spaces to the shield-electrode.

In yet preferred embodiments these air-electrode's cavities are not deep enough to reach the air-electrode's gas diffusion layer.

It is to be noted that the composite air-electrode can at the same time comprise cavities on the electrolyte surface of air-electrode and a gas-shield electrode with alveoli matrix abutted to said electrolyte surface.

In preferred embodiments the average distance between the electrolyte side of the air-electrode and the surface of the shield-electrode it is facing at is less than 1 mm.

In yet preferred embodiments the shield-electrode is even abutted to the air-electrode.

It is to be noted that the electrolyte side of the air-electrode can be an active layer on which oxygen reduction takes place or some additional layer such as a special layer blocking CO2 diffusion.

In preferred embodiments the footprint of the shield-electrode on its side facing the air-electrode is minimal whereby under cathodic polarization the air-electrode has the largest surface in contact with the electrolyte.

In especially preferred embodiments the footprint of the shield-electrode on its side facing the air-electrode represents less than 30% of its frontal surface.

Additionally, the inventor noticed that it was very convenient to use the shield-electrode in order to both (i) produce the insulating gas-shield, and (i) serve as the anodic current-collector recharging the cell.

In especially preferred embodiments the shield-electrode serves also as anodic current-collector during recharging of the electrochemical cell whereby simplifying the design and lowering the cost of the cell.

In preferred embodiments the shield-electrode presents the maximum surface area in contact with the electrolyte whereby under anodic polarization the polarization of the shield-electrode is minimal. In preferred embodiments the shield-electrode comprises a conductive layer with openings on its side facing bulk electrolyte (surface with holes, grid or loose meshwork, etc.).

It is to be noted that at the same moment it is preferable to have (i) a small footprint of the shield-electrode in order to let ions of the electrolyte flow freely between the air-electrode and the bulk of electrolyte during cathodic polarization of air electrode, and (ii) to have a maximum surface area of the said shield-electrode in contact with the electrolyte, that's why in preferred embodiments of the present invention the shield electrode comprises thin conductive walls, perpendicular to the air electrode, on which oxygen can evolve during charging.

It is also to be noted that the shield-electrode can comprise at the same moment conductive and non-conductive parts:

In an exemplary embodiment the shield-electrode comprises an oxygen evolution layer (a thin mesh of nickel), abutted or bonded to a honeycomb of non conductive material at the same moment forming hollow spaces and insuring electric insulation between the shield-electrode and air-electrode.

In another exemplary embodiment the shield-electrode comprises a honeycomb of conductive material sandwiched between a thin mesh of nickel and a non conductive grid having the same imprint as the honeycomb (FIGS. 11, 12, 16 and 17).

While in other embodiments, such as described in the second exemplary embodiment, the shield-electrode simply comprises a honeycomb of conductive material having one side in electrical contact with the side of air electrode while the other side is turned to the bulk of electrolyte.

In some other preferred embodiments the conductive part of shield-electrode surface comprises material presenting a high surface area to the bulk electrolyte whereby the shield-electrode's surface area in contact with electrolyte is high and hence the polarization is low during anodic polarization.

In this respect, the shield-electrode material can comprise corrugated or porous material. Also in some embodiments some additional porous material or fibers are placed within the hollow spaces, especially close to the side facing bulk electrolyte.

In preferred embodiments the shield-electrode is permanently electrically connected to the air-electrode whereby the resulting composite air-electrode is bifunctional having a single lead, simplifying the battery design, simplifying the battery circuitry and management system, and lowering the global cost.

In especially preferred embodiments, in order to simplify the design of the electrochemical cells, the shield-electrode and the current-collector of the air-electrode are permanently electrically connected by their tabs.

It is to be noted that such shield-electrode cannot be considered an auxiliary electrode, as it is not an electrically separate electrode with its own separate lead.

In preferred embodiments, the surface of air-electrode is electrically insulated from the shield-electrode's conductive parts whereby during anodic polarization any electrical current from said composite air-electrode overwhelmingly occurs on the shield-electrode thus protecting further the active layer of air-electrode from anodic polarization.

In yet especially preferred embodiments the composite bifunctional air-electrode comprises an electrical insulation layer placed between the surface of the air-electrode and shield-electrode's conductive parts.

In preferred embodiments the insulation material forms a pattern corresponding to the footprint of the shield-electrode facing the air-electrode.

In preferred embodiments, the shield-electrode comprises in addition an electrical and ionic insulation layer placed on its conductive parts to face the bulk of electrolyte. The shield-electrode is electrically and ionically insulated (i) on its surface to face the bulk of electrolyte, i.e. surface to be abutted to the separator, and (ii) on a nearby portion of the sides forming alveoli or channels, i.e on at least 0.05 mm but more preferably between 0.2 and 0.5 mm, whereby the dendrites that succeed in going through a separator, need additional time to reach the conductive sides of the shield-electrode on which oxygen evolution takes place; retarding the moment when they can establish an electric short-circuit with the charging anodic current-collector.

Another object of the invention is a secondary electrochemical Metal-Air battery comprising:
 either a metal electrode or a metal-hydride electrode,
 a composite air-electrode spaced apart from said metal or metal-hydride electrode, and
 a liquid electrolyte in contact with said composite air-electrode and said metal or metal-hydride electrode.

In the present description "Metal-Air" is indented as including also Metal-Water and Metal-SeaWater cases.

According to one exemplary embodiment the metal-electrode is made out of zinc.

According to other exemplary embodiments, the metal-air cell may use other metals in place of the zinc, including, but not limited to, aluminum, magnesium, iron, lithium, cadmium, and/or a metal hydride.

Yet another object of the invention is a method for manufacturing a shield-electrode comprising forming a layer with alveoli made out of electron-conductive yet indifferent material.

Yet another object of the invention is a method for manufacturing a composite air-electrode comprising:
 forming an air-electrode
 forming a shield-electrode
 applying optionally an insulation layer on the footprint of the shield-electrode to face the air-electrode
 combining the shield-electrode to the electrolyte side of the air-electrode.

Compared with regular bifunctional air-electrodes, composite bifunctional air-electrodes according to the present invention have the following advantages:
 (i) better anodic-cathodic performance;
 (ii) rigid construction, which is especially good in case of Zn metal-electrode;
 (iii) active-layer surface areas are preserved (which is determining for the discharge rate)
 (iv) the hollow spaces are acting as electrolyte reservoir;
 (v) lesser anodic polarization;
 (vi) easy-to manufacture if produced industrially.

It is also to be noticed that the method and the bifunctional air-electrodes object of this invention are very versatile: any type of air-electrode can be used and converted into a composite bifunctional air-electrode.

Eventually composite bifunctional air-electrodes according to the present patent application present extended service-life in comparison to classic bifunctional air-electrodes and lead to metal-air batteries presenting better overall characteristics.

The present patent application is particularly suitable for zinc-air or metal-air cells that can be used for example in electric vehicles or stationary applications.

The invention will be further understood from the following detailed description of specific embodiments with reference to accompanying drawings.

BRIEF DESCRIPTION OF THE DRAWINGS

FIG. 3 is a partial section view of a bifunctional air-electrode according to the first exemplary embodiment of the invention, shown with a separator during cathodic polarization.

FIG. 4 is a partial section view of a bifunctional air-electrode according to the first exemplary embodiment of the invention, shown with a separator at start of anodic polarization.

DETAILED DESCRIPTION OF THE PREFERRED EMBODIMENTS

Figure 1:
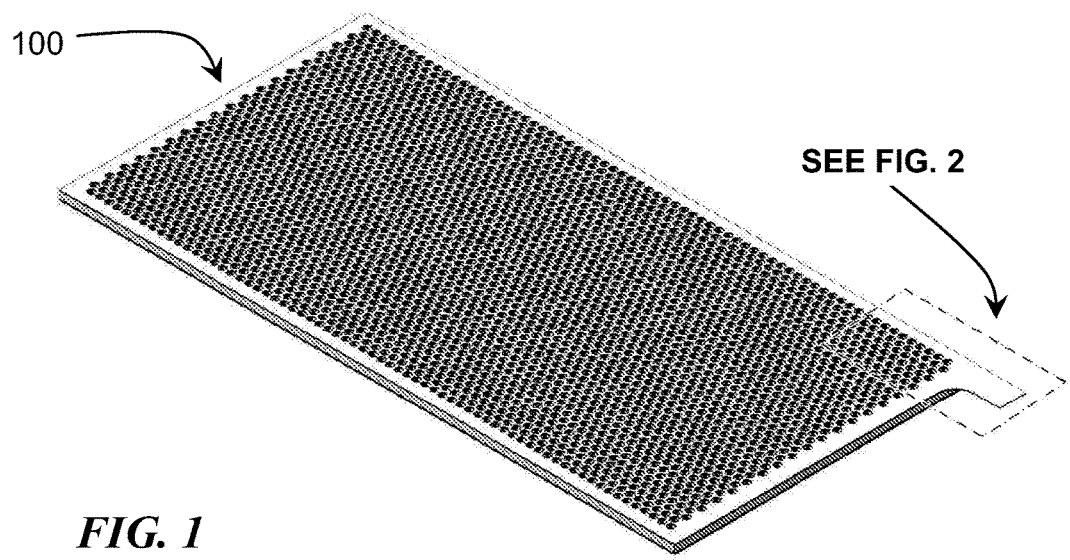
FIG. 1 is a perspective view of a bifunctional air-electrode according to a first exemplary embodiment of the invention.

The embodiments will be described with reference to the drawings. In all the drawings relating to the embodiments, same reference numerals are designating same or corresponding parts.

According to exemplary embodiments, shield-electrodes and composite bifunctional air-electrodes having improved performance are described herein.

FIG. 1 is illustrating a bifunctional air-electrode 100 which has a rectangular and flat shape but it could be cylindrical or any other shape to be included for example in AA AAA cylindrical, or coin or button, or flat prismatic format rechargeable cells.

Figure 2:
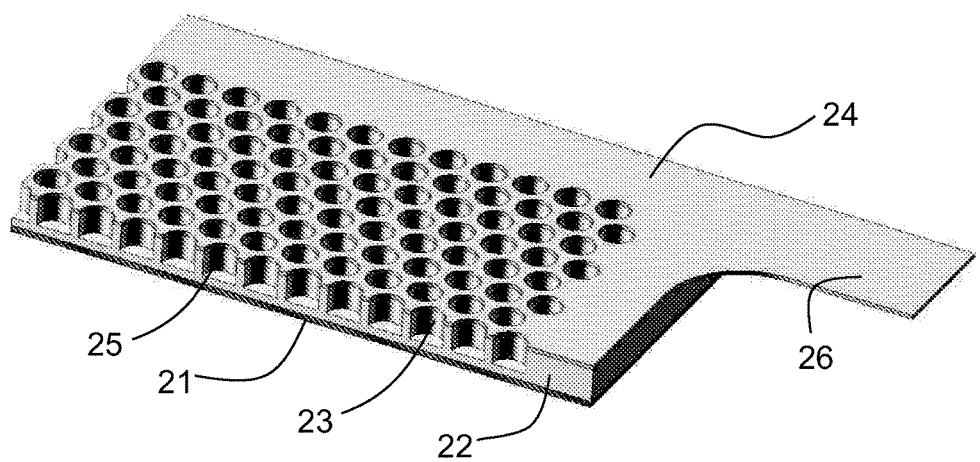
FIG. 2 is a close-up perspective view of a section of a bifunctional air-electrode according to the first exemplary embodiment of the invention.

Referring to FIG. 2 a hydrophobic gas diffusion layer 21 is combined to a hydrophilic active layer 22 having hollow spaces 23.

The active layer is covered by a conductive layer 24 which serves also as current collector. This conductive layer has a tab 26 which extends beyond the active layer surface. The edges of the conductive layer at the border of the hollow spaces are referred to by the reference numeral 25.

The gas diffusion layer is to be in contact with air while the active layer is to be in contact with liquid electrolyte and if necessary a separator.

In one exemplary embodiment the hydrophobic gas diffusion layer is made of 40% to 80% carbon black the rest being a hydrophobic binder such as PTFE. This gas diffusion layer may have a thickness between 10 µm to 500 um.

In other embodiments the gas diffusion layer can consist of a stack of sublayers such as described in US Patent Application US2011/0236772 incorporated herein by reference.

In other embodiments the hydrophobic gas diffusion layer is made of a hydrophobic layer from a single component, such as PTFE. This gas diffusion layer may have a thickness between 10 µm to 250 um.

Preferably the hydrophilic active layer is made of 5%-30% activated carbon+15%-40% oxygen reduction catalyst such as $MnO_2$ or $Co_3O_4$ etc+30%-60% carbon black+3%-15% PTFE, and has a thickness from 0.1 mm to 2 mm.

In another embodiment the oxygen reduction catalyst is simply carbon black.

In some embodiments the gas diffusion layer and/or the active layer can include one or several intermediary layers in order to improve adhesion to both gas diffusion & active layers;
facilitate chemical reactions; and,
increase conductivity (with the use of activated carbon).

It is to be noticed that the openings of these hollow spaces should all the time be accessible to electrolyte; which means that in some embodiment of the present invention (i) the metal-air cell includes a separator between the metal electrode and the air-electrode, and (ii) the active layer of the air-electrode is tightly abutted to the separator which is imbibed with liquid electrolyte. The configuration of this embodiment is conventional, but we should be careful that the cell is tightly packed otherwise, when the hollow spaces are flushed with electrolyte, the active layer could deteriorate a bit faster.

In some embodiments the hollow spaces can be in the form of holes, pits, gaps, cavities, blanks, apertures, openings, locations, any form where the active layer presents a void opening at the surface to face the separator imbibed with electrolyte.

Thus in some other embodiments the hollow spaces are blind, they don't reach the gas diffusion layer so that the bottom surface of the hollow surface is from the active layer, whereby during cathodic polarization an increased surface of active layer material if involved in oxygen reduction.

In one exemplary embodiment such as the one illustrated by FIG. 2, the hollow spaces are in the form of blind cylindrical holes, thereafter the holes.

In preferred embodiments the width of these hollow spaces is between 0.1 mm and 5 mm.

The hollow spaces shape should not be too narrow (width below 0.1 mm) which would tend to obstruct fast, nor too wide (width above 5 mm) which would give a lower ratio "active surface of active layer"/"active layer area". We define the "active surface of active layer" as the surface of the active layer accessible by the electrolyte.

Also, the wider the hollow spaces are, the longer it takes for the evolved oxygen during anodic polarization to entirely fill the hollow spaces in order to block electronic current between the active layer and the electrolyte.

Referring to FIG. 2, hollow spaces are shown of the same dimension and forming a repeated pattern but according to other embodiments of the invention they may be randomly distributed on the surface with randomly distributed dimensions.

On other embodiments the hollow spaces may be grooves helping evolved oxygen to escape from between the active layer and the separator during anodic process. However when oxygen is evolving it has such a pressure that it cannot be restrained.

Also, in embodiments according to the present invention, oxygen does not evolve inside the active layer; this makes easier its exhaust and eventually improves the service life of the air-electrode.

According to one embodiment of the invention, the active layer is prepared directly with hollow spaces formed, and then a conductive layer is applied to cover the remaining surface around the hollow spaces' openings.

One possible method to prepare the active layer with hollow spaces is simply to calender the layer with a pattern engraved on the pressure rollers. The active layer can also be prepared with screen stencil or spray printing method with the desired pattern.

According to another embodiment of the invention, the active layer is prepared, then hollow spaces are formed, then a conductive layer is applied to cover the remaining surface around hollow spaces. Hollow spaces can be produced on the active layer using different methods: drilling, punching, calendering with a pattern engraved on the pressure rollers . . . .

According to another method, the active layer is prepared, then covered by a conductive layer, and then hollow spaces are formed. In this case also hollow spaces can be produced on the active layer using different methods: drilling, punching . . . .

The conductive layer can be applied on the active layer by different manners: electrochemical deposition, plated, coated, pressed, sintered, glued . . . .

In preferred options for this first exemplary embodiment of the invention, the thickness of the conductive layer is from 1 μm to 200 μm, more preferably from 10 to 100 μm. When too thin the conducive layer, serving as a current collector (or as a support to current collector), would develop appreciable voltage drop inside the current collector and at current-collector/active-layer interface during high charge/discharge current rates; when too thick it is simply a resources' waste plus it could dilate the distance between the oxygen electrode and separator which in itself amounts to energy loss within the cell. Hence, thinner coatings would go for the cell with low current densities and vice-versa.

In some embodiments the air-electrode includes a current collector such as a mesh of conductive metal pressed or processed by other means inside or on the surface of the diffusion layer.

Referring further to FIG. 2, the tab 26 may be the continuation of conductive layer 24 or may be a conductive tab attached by welding, gluing or other method to the conductive layer.

FIG. 3 is a partial section view of air-electrode 100, shown with a separator 30 during cathodic polarization while the holes 23 are filled by electrolyte 31. Said electrolyte penetrates the active layer 22 which is hydrophilic; oxygen of atmosphere goes through the gas diffusion layer 21 and is consumed in the active layer 22 predominantly inside the holes at the simultaneous contact of the electrolyte and some oxygen reduction catalyst incorporated in the active layer.

FIG. 4 is another partial section view of air-electrode 100, shown in another configuration during anodic polarization.

At first, inside the holes being filled with electrolyte, oxygen evolves in the form of bubbles 40, practically totally at the edges 25 of the conductive layer 24 because:
(i) by nature, electric field intensity is higher at edges, that is at the edges 25 of opening part of the conductive layer, and,
(ii) electric current is flowing through the least resistant path which in this case is from the edges 25 through the electrolyte insides the holes to the separator surface facing the holes.

Figure 5:
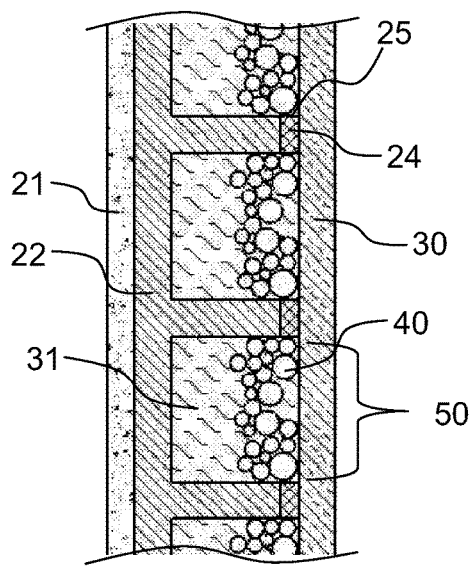
FIG. 5 is a partial section view of a bifunctional air-electrode according to the first exemplary embodiment of the invention, shown during anodic polarization while an oxygen bubbles gas-shield has been formed.

Then the hollow spaces are rapidly filled by evolving oxygen, replacing the liquid electrolyte in the hollow spaces, and this configuration is illustrated by FIG. 5. Evolved oxygen 40 forms a screen 50 of bubbles that blocks ions to travel between electrolyte bulk and the inner surface of the holes, thus blocking oxygen evolution in the active layer and protecting active-layer from degeneration. The bubbles are diminishing very much, practically totally, ionic conductivity because the bubbles would first evolve on the shield-electrode leaving air electrode practically intact.

Figure 6:
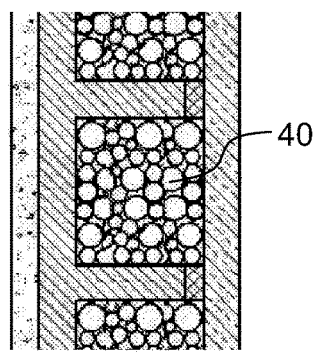
FIG. 6 is illustrating the bifunctional air-electrode of FIG. 5 when the hollow spaces are eventually totally filled by evolved oxygen.

FIG. 6 is illustrating the situation when the hollow spaces are eventually totally filled by evolved oxygen 40.

These hollow spaces 23 associated with the conductive layer edges 25 and electrolyte 31 and presence or not of bubbles screen 50 act as automatic current breakers and the only polarization current remaining is between the conductive layer and the separator. Thus, practically no current is flowing in the active layer and the active layer is protected from degeneration during anodic polarization.

An estimation of the time needed to fill entirely the holes can be computed easily and is lower than a second.

Then, when we submit to cathodic polarization the electrode 100 in the configuration of FIG. 6, i.e. holes filled by oxygen, the active layer first consumes the oxygen present in the holes and the liquid electrolyte is rapidly sucked from the bulk and fills the holes back, making the reduction of the oxygen coming from the gas diffusion layer possible again in the active layer.

Figure 7:
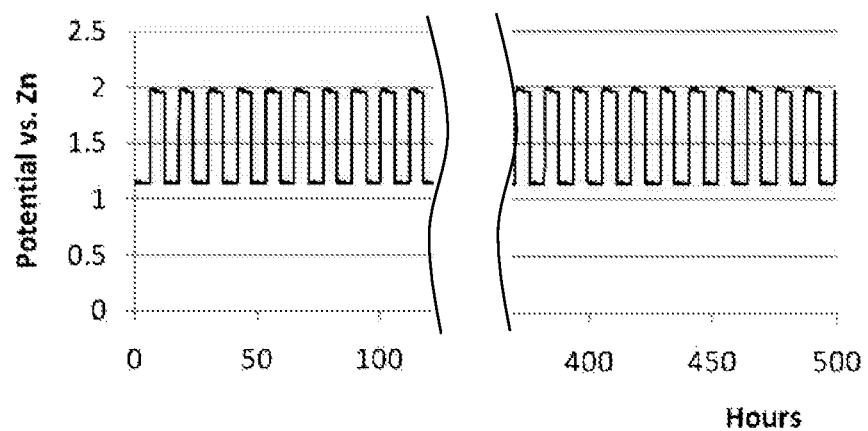
FIG. 7 is a curve showing the potential of a bifunctional air-electrode according to the first exemplary embodiment during anodic/cathodic polarization cycling.

FIG. 7 illustrates anodic/cathodic polarization cycling performance of the composite bifunctional air-electrode of the first exemplary embodiment.

Figure 8:
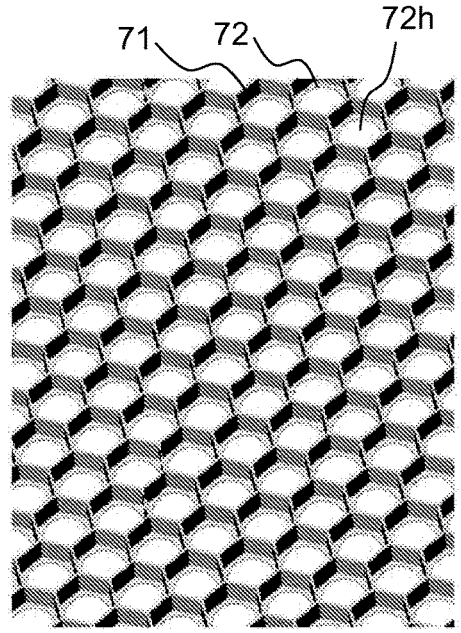
FIG. 8 is a close-up perspective view of a section of a gas-shield electrode with honeycomb matrix and conductive grid according to a second exemplary embodiment of the invention.

FIG. 8 is illustrating a simple shield-electrode comprising a honeycomb metallic matrix 71 constituting the walls of alveoli, the matrix 71 being topped by a conductive metallic grid 72 presenting holes 72h.

Figure 9:
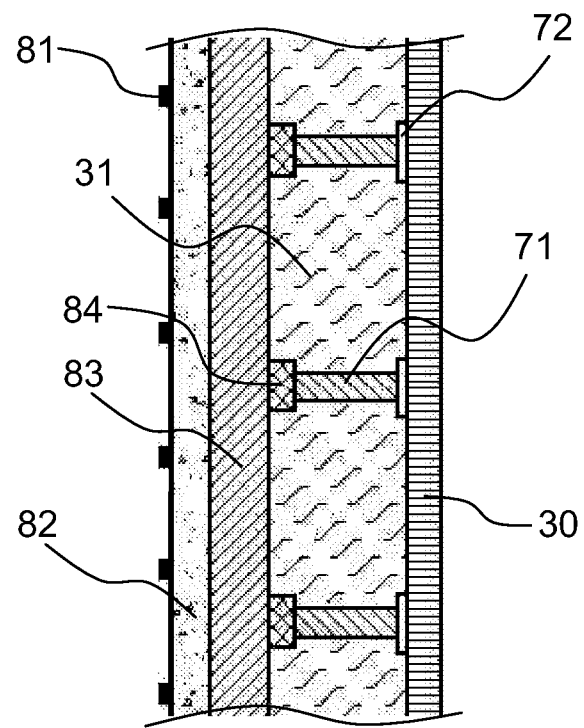
FIG. 9 is a schematic partial section view of a composite bifunctional air-electrode according to the second exemplary embodiment of the invention, shown during cathodic polarization while electrolyte fills the alveolus of the shield-electrode.

FIG. 9 is illustrating a composite bifunctional air-electrode comprising a current collector 81 bonded to a gas diffusion layer 82 which is itself bonded to an active layer 83. An insulation layer grid 84 is electrically insulating the active layer from a honeycomb matrix 71 as illustrated by FIG. 8. The composite bifunctional air-electrode is abutted to the separator 30, both soaked with electrolyte 31.

Referring to FIGS. 11, 12, 13 and 14 illustrating a composite bifunctional air-electrode 80 according to a third exemplary embodiment, a current collector 81 with its tab 81b is bonded to a gas diffusion layer 82 which is itself bonded to an active layer 83. An insulation layer grid 84 is electrically insulating the active layer from a honeycomb matrix 85 forming alveoli 86. An electrical tab 85b is extending to the honeycomb matrix.

It is to be noted that although the matrix 85 forms hollow spaces, the active layer has holes 83h in addition which are increasing the surface of active layer in contact with electrolyte.

Figure 13:
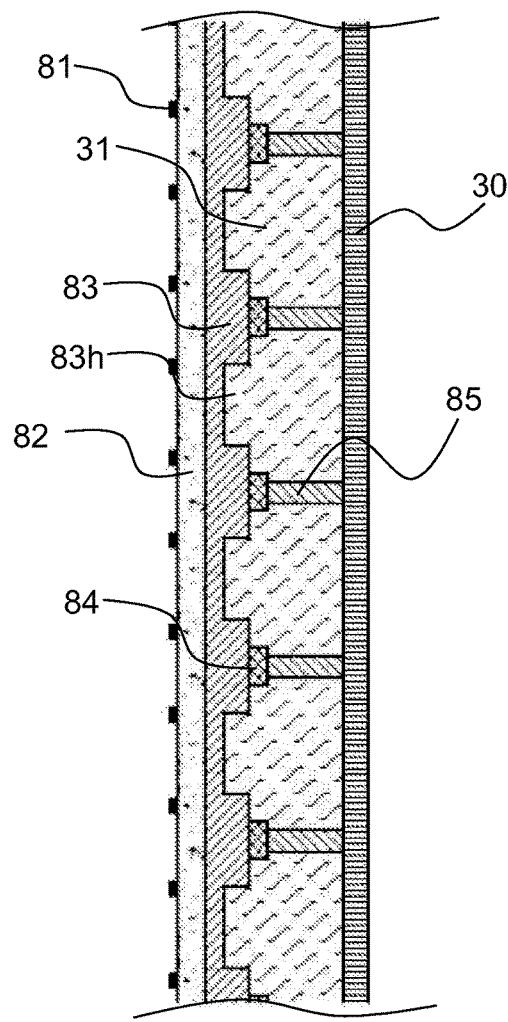
FIG. 13 is a schematic partial section view of the composite bifunctional air-electrode according to the third exemplary embodiment of the invention, shown during cathodic polarization while electrolyte fills the alveolus of the shield-electrode.
Figure 14:
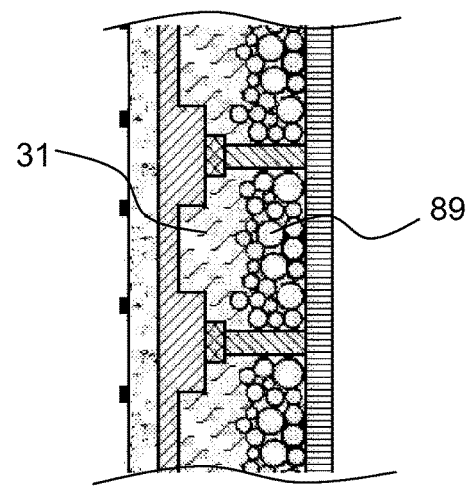
FIG. 14 is a schematic partial section view of a composite bifunctional air-electrode according to the third exemplary embodiment of the invention, shown during anodic polarization while an oxygen bubbles gas-shield has been formed.

Referring to FIGS. 13 and 14, a separator 30 is in contact with the honeycomb matrix 85 and the alveoli are filled by electrolyte 31.

FIG. 14 is illustrating the case during anodic polarization while oxygen bubbles 89 form a gas-shield blocking ions from the electrolyte soaking the separator 30 to reach and react with the active-layer, thus protecting it from degeneration.

FIG. 14 is also illustrating the fact that while the oxygen gas-shield is formed, some electrolyte 31 remains in contact with the active layer 83.

Again the bubbles are diminishing ionic conductivity very much, practically totally, because the bubbles would first evolve on the shield-electrode leaving air electrode practically intact.

It is to be noted that during anodic polarization, the air-electrode stays wet and keeps some electrolyte soaked in its pores. When polarization is changing back to cathodic polarization, the air-electrode absorbs the oxygen from the gas-shield in a short time and ionic contact with bulk electrolyte is re-established.

Figure 15:
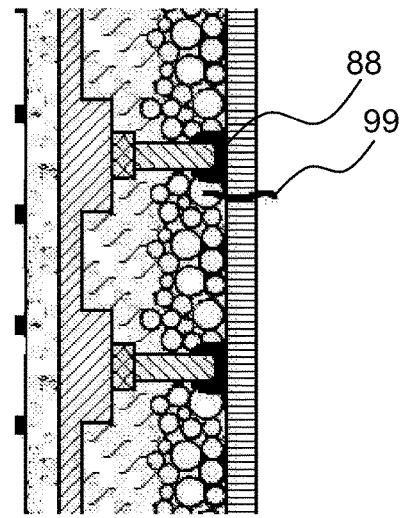
FIG. 15 is a schematic partial section view of a composite bifunctional air-electrode according to a variation of the third exemplary embodiment of the invention, shown with a dendrite piercing the separator.
Figure 16:
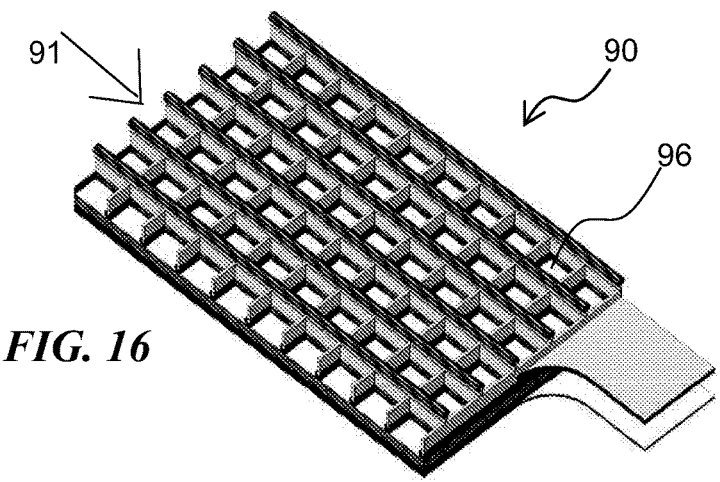
FIG. 16 is a close-up perspective view of a section of a composite bifunctional air-electrode according to a fifth exemplary embodiment of the invention.
Figure 17:
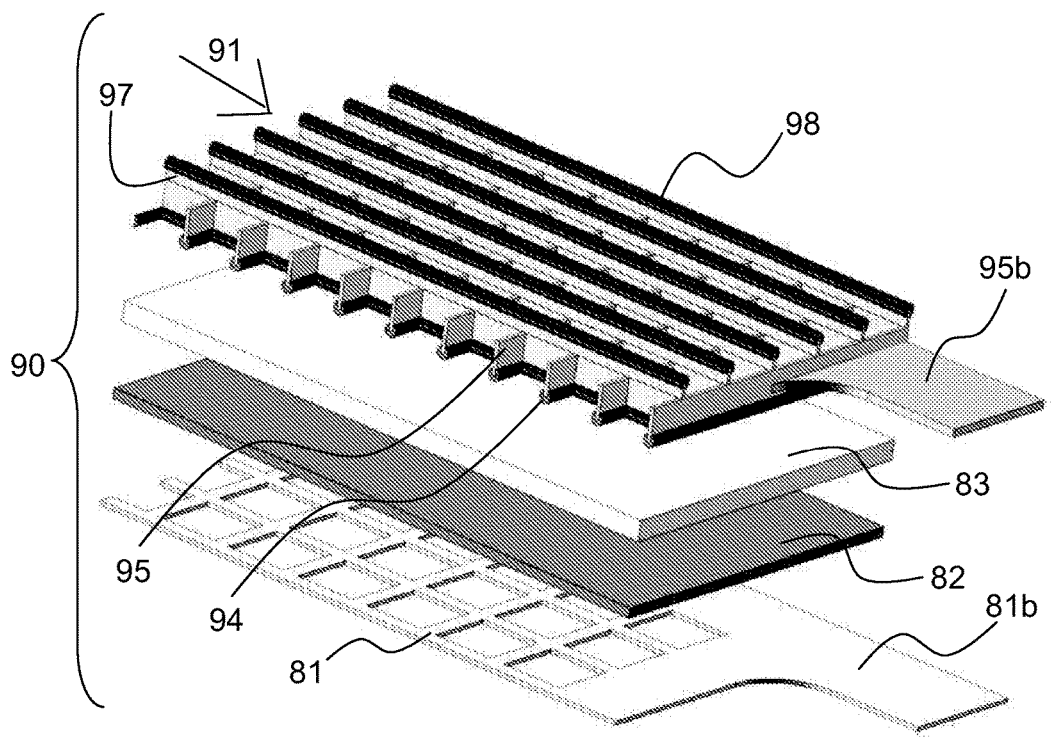
FIG. 17 is an exploded view of FIG. 16.

FIG. 15 is illustrating a variation of the third exemplary embodiment in which the gas-shield electrode comprises in addition an electrical and ionic insulation 88 giving some distance between the gas-shield and the separator.

FIG. 15 also illustrates the case when a dendrite 99 is piercing the separator and tries to reach the anodic current-collector, being in this exemplary embodiment the honeycomb matrix itself.

Indeed the inventor noticed that the insulation 88 can help preventing dendrites 99 to reach the anodic current-collector during charging.

FIGS. 16, 17, 18 and 19 are illustrating a composite bifunctional air-electrode 90 according to a fifth exemplary embodiment in which the gas-shield electrode consists essentially of a conductive matrix 95 of square alveoli, topped by a unidirectional grid formed by the rails 97.

These rails 97 form channels through which oxygen bubbles and electrolyte can travel easily during anodic polarization, pushed by oxygen evolution in a movement indicated by the arrow 91.

The matrix 95 is insulated from the active layer 83 by insulating glue 94.

Moreover in order to put some distance between the separator (not represented) which will be abutted to the rails 97, these rails 97 are topped by insulating glue 98. Indeed, in this way if some dendrites would pierce the separator and grow toward the non isolated part of rails 97 or the alveoli 95, the dendrites would have to progress in the channel to pass the insulated portion before producing any short-circuit.

Figure 18:
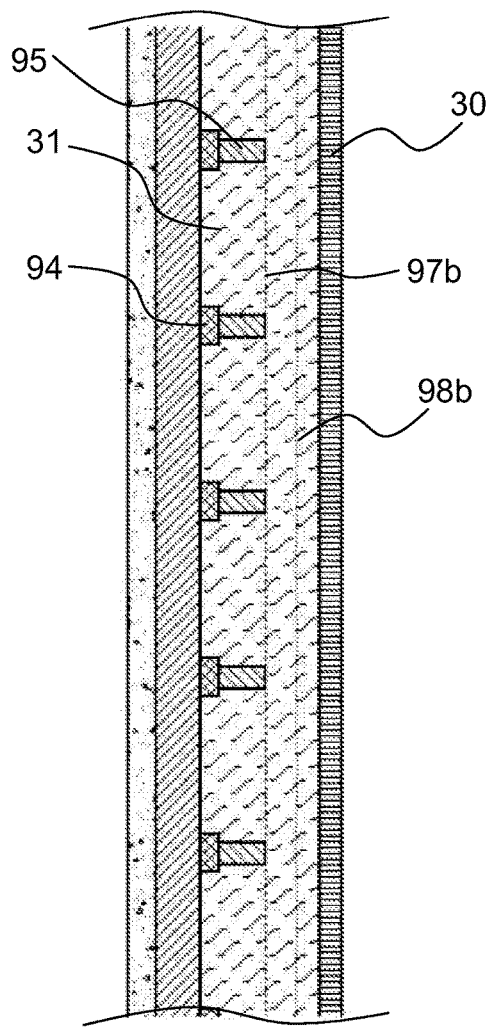
FIG. 18 is a schematic partial section view of the composite bifunctional air-electrode according to the fifth exemplary embodiment of the invention, shown during cathodic polarization while electrolyte fills the alveolus of the shield-electrode.
Figure 19:
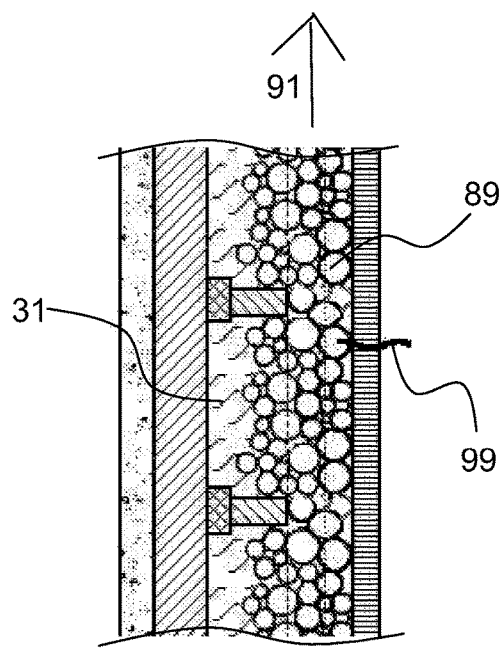
FIG. 19 is a schematic partial section view of a composite bifunctional air-electrode according to the fifth exemplary embodiment of the invention, shown during anodic polarization while the flow of oxygen bubbles and electrolyte is destroying the dendrites piercing the separator.

On FIGS. 18 and 19 the dotted line 98b indicates the limit of the insulation material 98; and the dotted line 97b indicates the connection between the alveoli matrix 95 and the rails 97.

FIG. 18 illustrates the situation during cathodic polarization of the composite electrode, when oxygen bubbles have already formed a gas-shield blocking ions to travel between the separator and the active-layer.

FIG. 19 illustrates the situation during anodic polarization of the composite electrode, during charging, and shows the flow 91 of bubbles 89 between the alveoli and the separator. The flow of bubbles can help flushing the dendrite 99 before the dendrite could pass the insulated part of the rails indicated by the line 98b.

Figure 10:
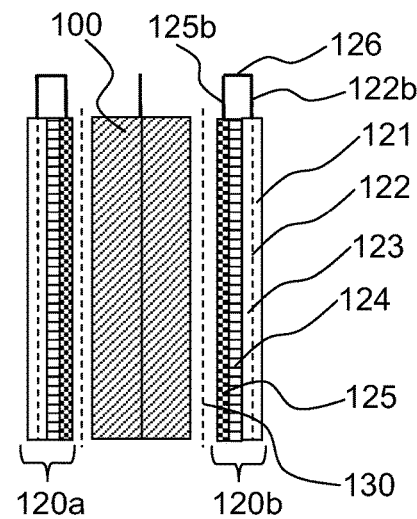
FIG. 10 is a schematic section view of a metal-air battery according to a fourth embodiment of the invention comprising two composite bifunctional air-electrodes.

FIG. 10 illustrates a metal-air battery according to the invention comprising two composite bifunctional air-electrodes 120a and 120b disposed symmetrically around a porous zinc-electrode 100, and two separators 130 preventing electrical contact between the air-electrodes and the zinc-electrode.

Each composite bifunctional air-electrode comprises: an oxygen diffusion layer 121, a current collector 122, an active layer 123, a non-conductive honeycomb matrix 124, and a conductive grid 125 serving as anode during charging. An electrical connection 126 permanently connects the tabs 122b (from the current-collector 122) and 125b (from the charging current-collector).

The porous zinc-electrode, the separators, the conductive grids, the honeycomb matrix and the active layers are bathing in an electrolyte not represented on this scheme.

Figure 20:
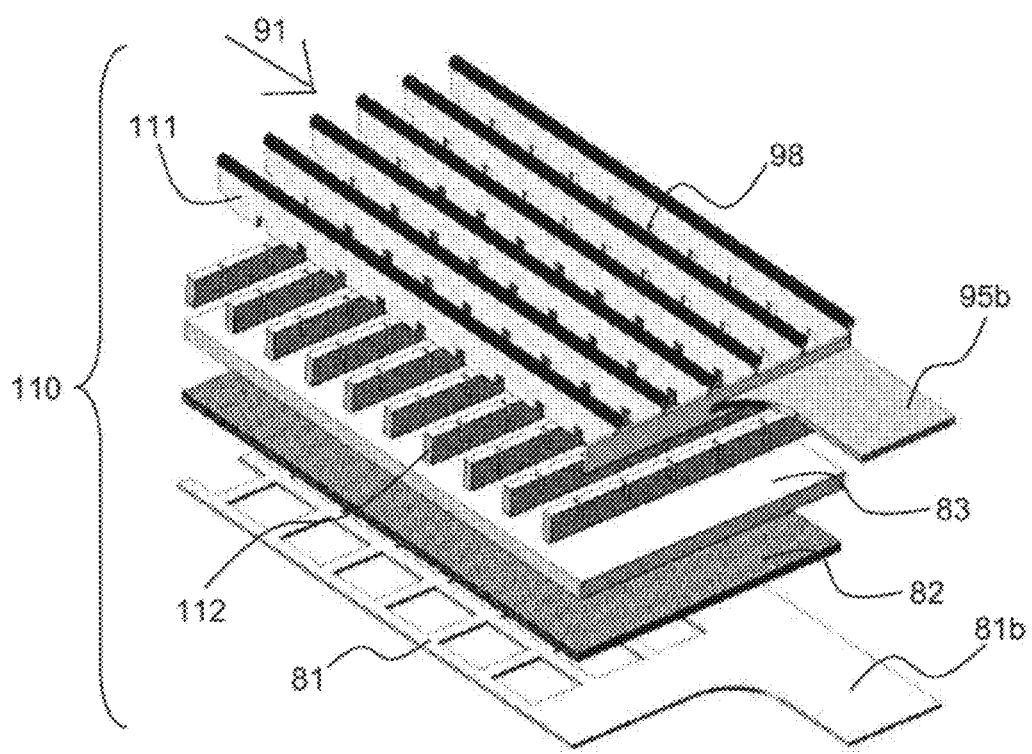
FIG. 20 is an exploded view of a section of a composite bifunctional air-electrode according to a sixth exemplary embodiment of the invention.

FIG. 20 illustrating a composite bifunctional air-electrode 110 according to a sixth exemplary embodiment in which the gas-shield electrode comprises conductive rails 111 fixed on perpendicular beams 112 to form a matrix of square alveoli, topped by a 10 unidirectional grid formed by the top part of rails 111. The top part of these rails 111 form channels through which oxygen bubbles and electrolyte can travel easily during anodic polarizaton, pushed by oxygen evolution in a movement indicated by the arrow 91.

The top of rails 111 is covered by electrical and ionic insulation material 98.

It is to be noted that composite bifunctional air-electrodes according to this invention do not need oxygen evolution catalyst and our exemplary embodiments do not contain any. This leads to cheaper and simpler electrodes and easy battery management (no need to limit charging and discharging voltages strictly for overcoming catalyst degeneration)

In fact the presence of oxygen evolution catalyst in the active layer of a bifunctional air-electrode according to this invention would have practically no impact on oxygen evolution during anodic polarization because oxygen evolution is localized on the shield-electrode in contact with the bulk of the electrolyte during anodic polarization.

It is to be noticed also that metal/air cells embodiments according to the present invention do not need auxiliary electrode and our exemplary embodiments do not comprise any. This leads to simpler battery management systems and depending on the case to cheaper, simpler, lighter and higher energy density metal/air cells.

EXAMPLES

In an air-electrode, gas diffusion layers, active layers and intermediary layers can be produced according to many methods already known by the one skilled in the art. Such methods are disclosed in US Pat. Appl 2011/0236772 (ReVolt, especially paragraphs [0240] . . . [0257]), also by U.S. Pat. No. 5,306,579 (Shepard 1992), and also by US Pat Appl 2007/0166602 (ReVolt 2006) the disclosure of all of these documents being expressly incorporated herein by reference.

However one difference with the teaching of these documents is that embodiments according to the present invention do not need to incorporate bifunctional catalyst in the active layer.

In addition the making of gas diffusion electrodes is also explained by prior art U.S. Pat. No. 7,682,725 (Datz 2010), the disclosure of which is expressly incorporate herein by reference.

The invention is illustrated but not limited to the following examples.

Example 1

In a first exemplary embodiment illustrated by FIGS. 1, 2, 3, 4, 5 and 6 we employed:

PTFE suspension (DuPont™ Teflon® PTFE TE-3893, particle size 0.05 to 0.5 μm, solid content 60%, density 1.5 g/cc), Carbon black: Vulcan XC 72R from CABOT (BET 250 m2/g, 30 nm particle size)

Activated carbon: SX Plus from Norit (BET 1100 m2/g), $MnO_2$ oxygen reduction catalyst from Merck.

The gas diffusion-layer is made of 65% carbon black+ 35% PTFE and has a thickness of 0.3 mm; the hydrophilic active-layer is made of 22% activated carbon+22% of MnO2+46% carbon black+10% PTFE and has a thickness of 0.6 mm; the conductive layer is made of a 50-100 um thick nickel deposition; and then hollow spaces have been done with a CNC machine by drilling 0.4-0.5 mm deep with a small end-mill tool diameter 0.75 mm, 3 adjacent holes forming equilateral triangles with 1 mm distance between their centers.

When we say that the gas diffusion layer includes 35% PTFE, we mean that the weight of the dry particles of the PTFE represents 35% of the total final weight of the gas diffusion layer.

For this example the gas diffusion layers have been prepared according to the following:
- Mix carbon-black powder, add water, add PTFE suspension, centrifuge it, you get a paste. Dry this paste for 15 hours in a desiccator at 100° C.
- Then add organic solvent acetone, it becomes a soft material like dough that we calendar a few times till 0.2-0.3 mm thickness.
- Again dry it to get the layer ready for further making the full air-electrode.

Also active layers have been prepared according to the following:
- Mix catalyst and carbon-black powder together and process the mixture in a planetary ball mill 1 hour to attach the catalyst to the carbon black and improve activity of the carbon black.
- Then, add water, add PTFE suspension, centrifuge it, you get a paste. Dry this paste for 15 hours in a desiccator at 100° C.
- Then add acetone as organic solvent, it becomes a smooth material like dough that we calender a few times till 0.6-0.8 mm desired thickness.
- Again dry it to get the layer ready for further making the full air-electrode.

Hot press the 2 layers together at 140-160° C. to attach the layers together.

Protect the diffusion layer with an adhesive sheet, and electrochemically deposit nickel on the all surface of the active layer. Then with the help of CNC machine 0.75 Dia holes are drilled all over the active layer surface but 3 to 5 mm of the borders that will be reserved for gluing to the case of a cell.

Eventually a tab is welded at a corner of the nickel conductive surface.

FIG. 7 illustrates anodic/cathodic polarization cycling performance of the air-electrode of this first example. The potential of air-electrode is measured vs a Zn reference electrode in 350 g/l KOH electrolyte at anodic current density=cathodic current density=25 mA $cm^{-2}$, with cathodic duration=anodic duration=6 h.

It is to be noted that here the cathodic current and anodic current densities are calculated according to their actual surface area (SA). Cathodic SA=hole opening SA multiplied by the number of holes in the electrode; while Anodic SA=electrode SA−Cathodic SA. Thus the actual SA is less (approx. twice) than the one calculated as per the electrode SA. So, the electrode current densities are approx. twice lower.

This graph shows that even after 40 cycles the characteristics remain without noticeable change from the start.

Example 2

In a second exemplary embodiment illustrated by FIGS. 8 and 9 we employed:
- an air-electrode prepared as described for example 1 comprising a 0.3 mm thick diffusion-layer and 0.5 mm thick active layer but without nickel plating;
- a shield-electrode comprising a 0.8 mm thick honeycomb matrix 71, illustrated by FIG. 8, forming 2.5 mm diameter alveoli. This honeycomb matrix is made out of nickel, with 0.2 mm thick walls and is topped by a grid 72 made out of a 0.2 mm thick nickel sheet with 2 mm diameter openings. The honeycomb matrix and its top grid are prepared by a laser cutting.

The shield-electrode is fixed to the active layer of the air-electrode by some 0.2 mm thick layer of alkaline-resistant glue 84, such as RTV silicone rubber, serving also as electric insulation layer.

Example 3

In a third exemplary embodiment illustrated by FIGS. 11, 12, 13, 14 and 15 we employed:
- an air-electrode prepared as described for example 2;
- on which is electroplated on the gas-diffusion side a 3 mm square pattern grid of 0.2 mm thick nickel serving as the current collector 81;
- a honeycomb alveolar matrix is prepared by laser cutting and fixed to the active layer of the air-electrode by some 0.2 mm thick layer of alkaline-resistant glue 84, such as RTV silicone rubber, serving also as electric insulation layer.

Once these layers assembled, the tab of the current collector of the air-electrode 81b is permanently connected, by welding, to the electrode's tab of the gas-shield 85b thus resulting in a composite bifunctional air-electrode, that can be operated with only two leads and suitable for cathodic and anodic usage in a metal-air cell.

It is to be noted that the glue 84 helps getting a more robust air-electrode and helps preventing the thin alveoli walls to enter and damage the active-layer 83 but at the cost of diminishing active-layer's active surface by an increase of the footprint of alveoli by the presence of glue.

In a variation of this third exemplary embodiment illustrated by FIG. 15, the gas-shield electrode comprises an insulation material 88 made out of non-conductive material in order to prevent dendrites piercing the separator to reach the honeycomb-conductive matrix. This insulation material 88 is made out of alkaline-resistant glue, such as RTV silicone rubber.

Example 4

In a fourth exemplary embodiment illustrated by FIG. 10 we employed:
- a central 10 mm thick 80% porous zinc-electrode, classically wrapped with rayon type separator sheets and further with a nylon fabric.
- 2 composite bifunctional air-electrodes prepared according to the third exemplary embodiment
- a 4M solution of KOH as electrolyte.

All the parts are presenting 35×70 mm surface dimensions.

Figure 11:
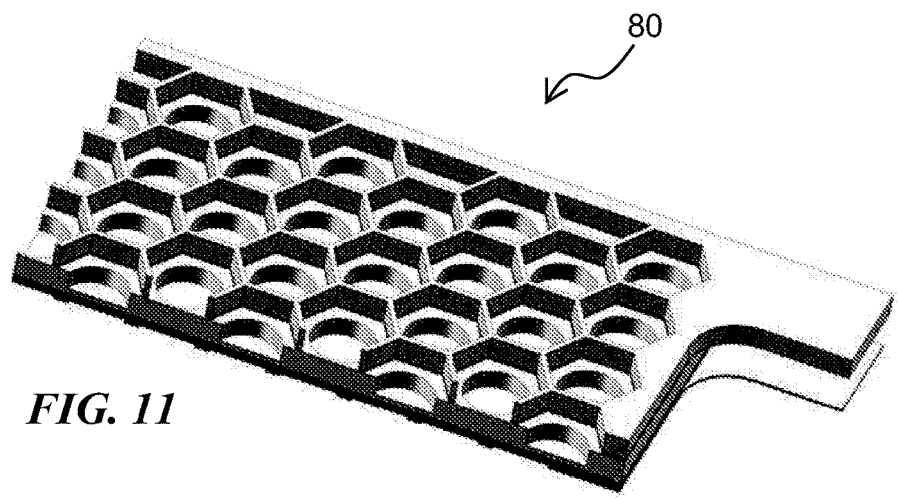
FIG. 11 is a close-up perspective view of a section of a composite bifunctional air-electrode according to a third exemplary embodiment of the invention.
Figure 12:
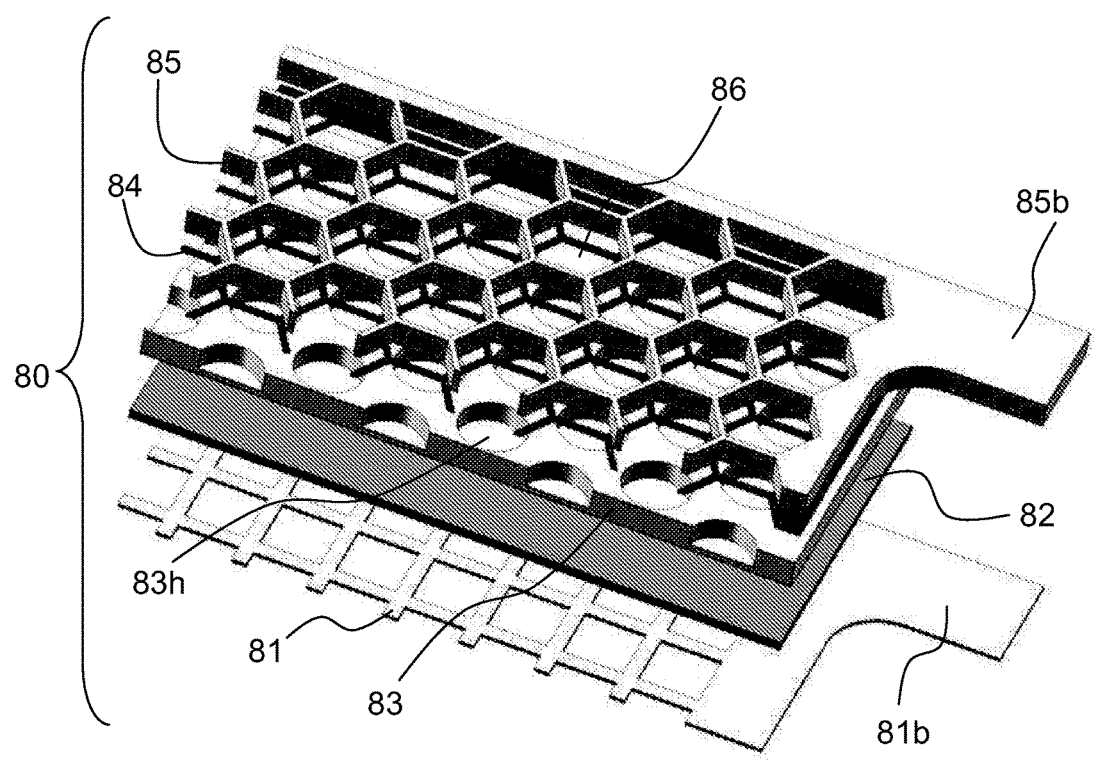
FIG. 12 is an exploded view of FIG. 11.

A surrounding box, the casing, not represented on FIG. 11, is made out of 0.2 mm thick PVC, welded to the borders of the air-electrode by ultra-sound welding to make a vented battery.

Example 5

In a fifth exemplary embodiment illustrated by FIGS. 16, 17, 18 and 19, a composite bifunctional air-electrode 90 according to a fifth exemplary embodiment in which the gas-shield electrode consists essentially of a nickel matrix 95 forming 1.5 mm wide squares by 0.8 mm height alveoli 96 with 0.1 mm thick walls, topped by a unidirectional grid formed by the rails 97 being 0.4 mm height above the square alveoli. Actually these rails 97 are just the continuation in one direction only of the walls forming the alveoli. They are also made out of 0.1 mm thick nickel.

In this exemplary embodiment, the matrix 95 is insulated from the active layer 83 by 0.15 mm thick insulating glue 94 on the bottom and on 0.3 mm height on the bottom sides of the said alveoli walls. Also the rails 97 are insulated by 0.15 mm thick insulating glue 98 on their top and on a 0.3 mm height on the side at the top of said rails. Both glues 94 and 98 are RTV silicone rubber.

Example 6

The sixth exemplary embodiment illustrated by FIG. 20 is a variant of the fifth exemplary embodiment in which the matrix is prepared with 0.1 mm thick by 1.4 mm height nickel rails 111 presenting notches, fixed on 0.3 mm width by 0.8 mm height PVC beams 112 presenting matching counter notches. The distance between two adjacent rails or beams is 1.5 mm thus forming alveoli with dimension 1.5 mm×1.5 mm squares by 0.8 mm depth.

MODIFICATIONS AND VARIATIONS

In the detailed description and examples above, embodiments of the invention have been shown and described simply, by way of illustration and exemplary teachings of the best mode contemplated by the inventors of carrying out the invention.

However the scope of the present invention is not limited to the specific details and the illustrative examples shown and described. It will be apparent to persons skilled in the art that modifications and variations can be made without departing from the scope of the invention.

The invention claimed is:

1. A method of operating a secondary Metal-Air electrochemical cell with a bulk of liquid electrolyte, a metal anode and an air cathode, the air cathode comprising cavities serving as hollow spaces on a side to be facing the anode, the method comprising the steps of:
   a) at start of a charging session, creating in less than 2 seconds an oxygen gas-shield on an electrolyte side of the air cathode to be facing the anode obstructing ion passage between the bulk of the electrolyte and the air cathode, wherein oxygen forming the oxygen gas-shield evolves from the air cathode at a time of charging,
   b) charging the cell without anodic polarization of the air cathode with the help of
      (i) electric conductive material placed between the electrolyte side of air cathode and the bulk of electrolyte, and,
      (ii) the said oxygen gas-shield obstructing passage of ions of the electrolyte between the electrolyte side of air cathode and the bulk of electrolyte,
   c) removing the oxygen gas-shield at start of a discharging session, wherein the step of removing oxygen gas-shield at start of a discharging session is performed by the air cathode consuming oxygen from its electrolyte-side under cathodic polarization.

2. An air cathode, for use in metal-air electrochemical cell with a bulk of liquid electrolyte, the air cathode comprising cavities serving as hollow spaces, on which under anodic polarization oxygen gas evolves from the electrolyte, wherein a geometry of said air cathode is such that said air cathode permits to perform by forming a gas-shield under anodic polarization, the following steps:
   (a) at start of a charging session, creating in less than 2 seconds an oxygen gas-shield on an electrolyte side of the air cathode obstructing ion passage between the bulk of the electrolyte and the air cathode, wherein oxygen forming the oxygen gas-shield evolves from the air cathode at a time of charging,
   (b) charging the cell without anodic polarization of the air cathode with the help of
      (i) electric conductive material placed between the electrolyte side of air cathode and the bulk of electrolyte, and,
      (ii) the said oxygen gas-shield obstructing passage of ions of the electrolyte between the electrolyte side of air cathode and the bulk of electrolyte, and
   (c) removing the oxygen gas-shield at start of a discharging session, wherein the step of removing oxygen gas-shield at start of a discharging session is performed by the air-cathode consuming oxygen from its electrolyte side under cathodic polarization; and
      while, without presence of said gas-shield, the air cathode offers sufficient passage to allow ions of the electrolyte to flow therethrough.

3. The air cathode according to claim 2 wherein material from which the air cathode is made forms a matrix with hollow spaces retaining the gas-shield.

4. The air cathode according to claim 2 herein the hollow spaces have an average surface area of between 0.04 mm$^2$ to 25 mm$^2$.

5. The air cathode according to claim 2 wherein said air cathode comprises an alveolar matrix with walls separating an alveoli.

6. The air cathode according to claim 5 wherein the walls have an average thickness of 0.05 mm to 0.5 mm.

7. The air cathode according to claim 3, further comprising a grid forming channels to guide oxygen bubbles that flow during anodic polarization.

8. The air cathode according to claim 7 wherein the grid forming channels comprise sides, and at least a portion of the sides of said grid forming channels is conductive.

9. The air cathode according to claim 2 wherein said air cathode has a thickness of 0.2 mm to 3 mm.

10. The method according to claim 1, wherein the air cathode comprises cavities that are formed from an alveolar matrix with walls separating an alveoli.

11. The method according to claim 10, wherein the walls have an average thickness of 0.05 mm to 0.5 mm.

12. The method according to claim 10, wherein the air-cathode further comprises a grid forming channels to guide oxygen bubbles that flow during anodic polarization.

13. The method according to claim 12, wherein the grid forming channels comprises sides, and at least a portion of the sides is conductive.

14. The method according to claim 10 wherein the air-cathode has a thickness of 0.2 mm to 3 mm.

* * * * *